April 2, 1968
P. GOUT
3,376,535
DEVICES OF MOVING CONNECTIONS BETWEEN TWO FIXED ELECTRIC WINDINGS
Filed July 21, 1966
2 Sheets-Sheet 1
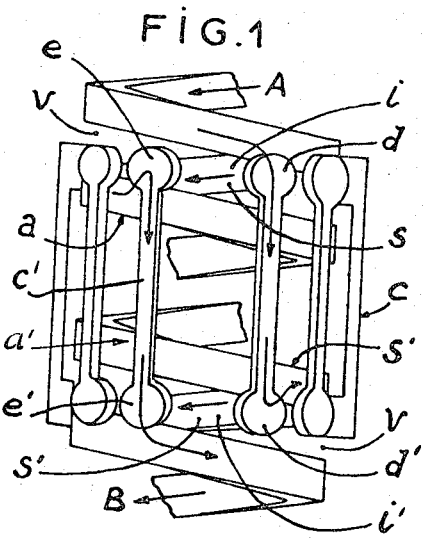
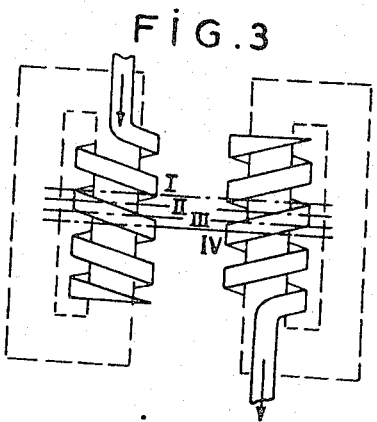
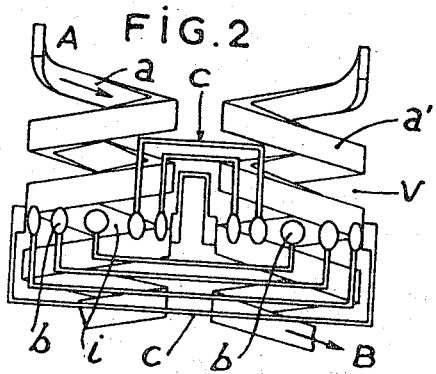
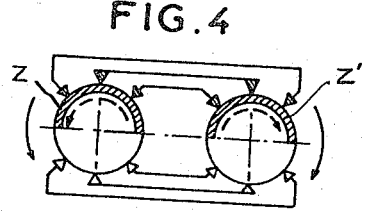
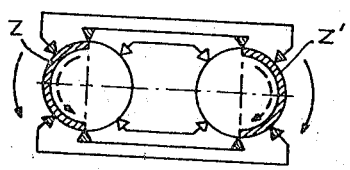
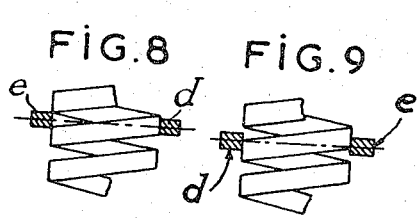
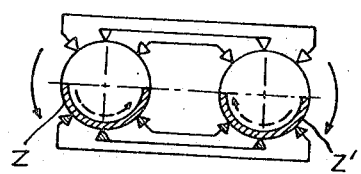
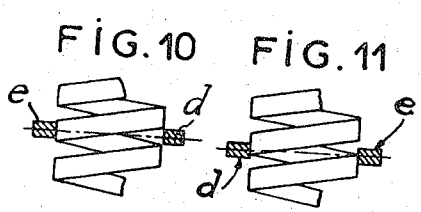
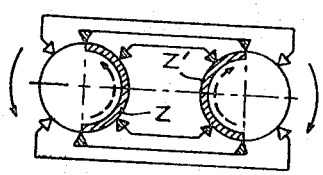

April 2, 1968  P. GOUT  3,376,535
DEVICES OF MOVING CONNECTIONS BETWEEN
TWO FIXED ELECTRIC WINDINGS
Filed July 21, 1966  2 Sheets-Sheet 2

United States Patent Office 3,376,535
Patented Apr. 2, 1968

3,376,535
DEVICES OF MOVING CONNECTIONS BETWEEN TWO FIXED ELECTRIC WINDINGS
Paul Gout, 22 Rue Roger Barbe, Seyssinet, Isere, France
Continuation-in-part of application Ser. No. 324,108, Nov. 15, 1963. This application July 21, 1966, Ser. No. 566,778
Claims priority, application France, Nov. 30, 1962, 43,099, Patent 1,349,306
11 Claims. (Cl. 336—138)

ABSTRACT OF THE DISCLOSURE

A control for two electrically conductive coils consisting of two circular arrangements of separate contacts or brushes, one for each coil, the contacts of one arrangement being connected to respective contacts of the other arrangement, the contacts selectively making contact with the turns of the coils or fitting between the turns.

---

This application is a continuation-in-part of my earlier copending application Ser. No. 324,108, filed Nov. 15, 1963, now abandoned. This invention relates to controls for electrical windings.

The majority of known devices involving moving connections between two fixed electrical windings consist of devices for causing contacts to turn around each winding while following the wire or for causing solenoids to turn on their axes in front of brushes which follow the turns thereof or for winding and unwinding the wires while causing the windings and the magnetic cores to turn.

All of these devices involve the setting in motion of large masses or the deformation of bridges of contact and sometimes of the wires. The result is a slowness of adjustment which is unacceptable in many cases of regulation.

An object of the present invention is to remedy these drawbacks by providing moving connections between two fixed electrical windings in an arrangement in which the short trajectory of the moving parts and their low inertia allow a rapid modification of the number of turns in the circuit.

In device of the invention, the windings are constituted by bare wires whose turns are separated by gaps or by insulators. Brushes are disposed around each winding and register in the interval between turns without touching the wire. Moreover, each brush of a winding is connected by a conductor bridge to a brush occupying the same position on the other winding. The brushes are displaced simultaneously along the windings. In this movement the mechanism of displacement of the zones of contact around the windings is unique. More particularly, since the points of contact of a turn are situated in a plane normal to the axis of the winding helix and since the wire has a certain width, the path of the helix in the plane is an arc of circumference which turns when the plane is displaced.

If, however, there are two identical windings and there are linked, by connections, homologous points of contact from one winding to the other, in such a way that the parts of turns intercepted by the brushes of two adjoining connections are traversed by currents of the same direction, running from one connection to the other, there cannot be a circulating current in any circuit which would include two bridges of contact and the parts of turns included between them.

The passage of current from one winding to another is insured without interruption during the displacement of rings of brushes, these being displaced synchronously.

The paths of the turns are in the same direction, the windings running in the same direction and in the opposite direction if the wires are wound in opposite directions. The duality of the system eliminates the necessity of creating a separate current for compensation.

During the displacement of the rings of brushes, the number of turns in circuit in one winding, included between an end thereof and the corresponding ring of brushes, increases, while it diminishes in the other winding between the ring of brushes and an end thereof. The inductions of the windings therefore vary inversely from one winding to the next.

If the windings are equipped with magnetic circuits, it is possible to obtain variable voltages at secondary winding terminals. The levels in the voltage curve have the value of the potential difference existing at the ends of the winding part included between two adjacent contact bridges.

If rings of brushes are used which have a large number of contact points per turn, the progression of the voltage is practically continuous and can be compared advantageously with the results obtained by the collectors of the so-called direct current machines.

Finally, if for each winding there are at least two brushes positioned in such a way that when one is in the interval between turns, the other is in perfect contact with the wire, there is always at least one contact bridge in circuit between the two windings. The general current is therefore never cut off. The contact members can be shoes or rollers which at the same time would be contact bridges. It is also possible in accordance with the invention to place several devices in parallel by superposing the contact rings.

The invention will be better understood with the aid of the following description and with reference to the attached drawings showing, by way of non-limiting examples, some embodiments of the invention.

In the drawing:

FIGS. 1 and 2 show the connections between two windings disposed end to end and side by side according to two respective embodiments of the invention;

FIGS. 3 to 7 illustrate the mechanism for rotating the zones of contact;

FIGS. 8 to 11 show the successive phases of the displacement of two diametrically opposed contact bridges;

Figure 12:
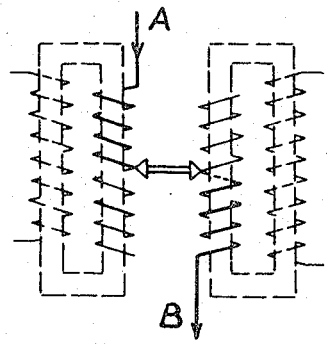
FIGS. 12 and 13 are schematic diagrams of the two windings as adjustable primary windings of a transformer and autotransformer respectively.

In FIG. 1, each brush $d$ for a wire $a$ is connected through a conductor bridge $c$ to a brush $d'$ which occupies the same position on wire $a'$. In the course of axial displacement of the brush rings, the intervals separating two adjoining brushes will successively face a gap $v$ between turns. This is the illustrated case of interval $i$ between brushes $d$ and $e$ which are respectively in contact with opposite extremities of a turn $s$. Brushes $d$ and $e$ (which, for example, are coplanar in a plane perpendicular to the axis of said turns) are connected, respectively, to brushes $d'$ and $e'$ (which, for example, are coplanar in a plane parallel to the plane of brushes $d$ and $e$) which, on wire $a'$ occupy the same position; i.e., the interval $i'$ separating them is also included between the ends of a turn $s'$. Consequently, the wire of one of these windings cannot in any case close the opening of the corresponding turn of the other winding. Moreover, when a brush is in the gap between adjacent turns, it will not short-circuit the turn since it does not touch the wire because it is smaller than the interval between such adjacent turns.

Since the parts of a turn included between brushes $d$ and $e$ are electrically identical to the parts of a turn included between the brushes $d'$ and $e'$ and since the current runs in the same direction from $d$ to $e$ and from $d'$ to $e'$, for example, there is no current in circulation between the contact bridges $c$ and $c'$. The latter, moreover, are disposed in such a way that the magnetic fields which affect them produce, at their ends, opposed voltages with the same direction.

The same observations also apply to FIG. 2 which relates to two windings placed side by side.

In these FIGS. 1 and 2, when the current enters, for example, at the end A of wire $a$, it emerges at the end B of wire $a'$ or inversely as shown by the arrows.

FIG. 3 shows the successive positions I, II, II, IV of the plane containing the rings of contact when the wires are wound in opposite directions. FIGS. 4, 5, 6 and 7 show, in plan, the rotation of the zones of contacts $z$ and $z'$, in the successive positions I, II, III, IV of the plane which contains them.

The zones of contact are represented by arcs in bold lines; the directions of rotation are indicated by solid-line arrows and the direction of the current by arrows and dashes. It is seen that the elements of current have the same direction in the parts of wire comprised between two adjacent contact bridges.

FIGS. 8 to 11 show the successive phases of the displacement of the brushes $d$ and $e$ of two diametrically opposed contact bridges. The contact bridges are seen from the end, from the side of brushes $d$ and $e$; they slide downward over the turns of the wires. In FIG. 8 the bridge including brush $d$ is the only one in circuit. In FIG. 9 the two bridges including brushes $d$ and $e$ are in circuit and in parallel. In FIG. 10, the bridge including brush $e$ is in circuit alone. In FIG. 11, the two bridges are again in circuit and in parallel, and so on.

The current is, therefore, never cut off. The voltage thus varies in steps by the value of the voltage of one-half turn.

FIG. 12 shows an application of the device of FIG. 2 in which each winding constitutes the primary of a transformer. The feed voltage applied to ends A and B of the windings is constant. The modification of the number of turns produced by the displacement of the brushes determines a variation of the induction in the cores, thereby producing a variation in the voltage at the terminals of the secondary windings.

Figure 13:
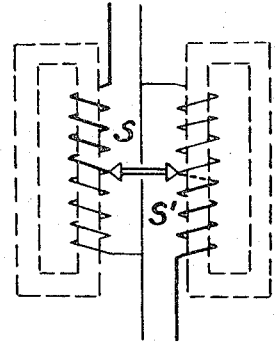

FIG. 13 represents an application of the invention to two auto-transformers coupled in series and inversely. The turns of the wires are outside the turns common to the primary and secondary. The displacement of the contacts modifies the ratio of the number of turns of each auto-transformer by reducing, for example, the number of turns $s$ of one common winding at the same time as it increases the number of common turns $s'$ of the other. The result is variations in the secondary voltage of the second auto-transformer, the first being fed with constant voltage.

Figure 14:
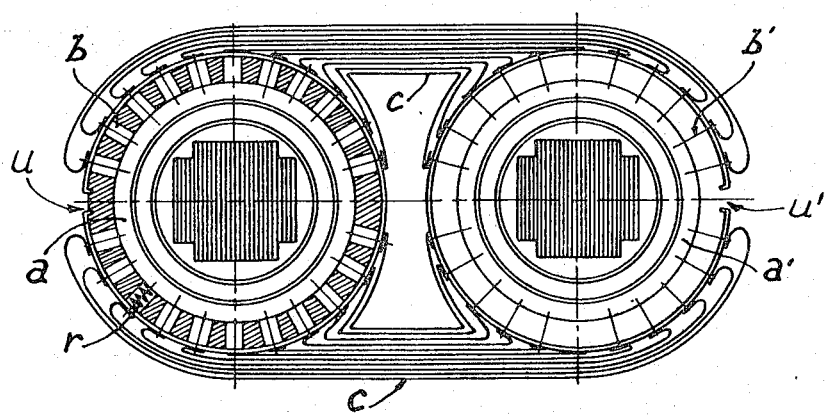
FIG. 14 is the plan view of two rings of brushes and their connections.

FIG. 14 is the plan view of two rings of contacts surrounding windings disposed side by side. Brushes $b$ and $b'$ lodged in cells of rings $u$ and $u'$ made of insulating material, are applied against the windings of springs $r$. The connections $c$ linking the brushes of one winding to to the other are made of copper strip.

Figure 15:
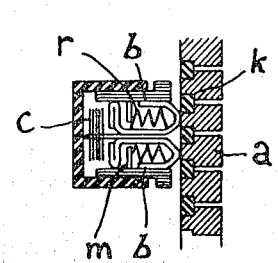
FIG. 15 shows two brushes in section, belonging to two superposed rings.

FIG. 15 shows, in vertical section, two brushes belonging to two superposed rings. They are each formed of a leaf of bronze folded in such a way as to serve as a lodging for spring $r$ which, as it presses against the connecting wire $m$, applies the brush against the wire $a$ whose turns are separated by an insulator $k$.

Figure 16:
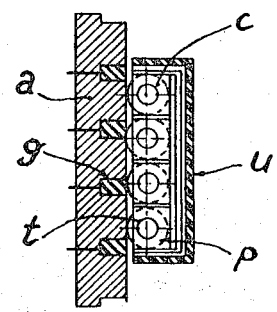
FIG. 16 shows, in end view, four contact bridges with rollers, mounted in parallel, in contact with a winding part.

FIG. 16 shows, in end view, four contact bridges constituted by bronze rollers $c$ pressing at each end on the windings. The wires are wound in adjoining turns separated by a thickness of paper. Pins $g$ of insulating material, are screwed between the turns and aligned along the generatrices of contact of the winding cylinders. These pins replace the interval between turns, which allows lodging a greater number of turns on the cores.

The ends of the rollers bear journals $t$ of steel, which turn in bearings $p$ insulated from one another and also insulated from the cage $u$ which entrains them along the windings according to the process in FIGS. 8 to 11. The four rollers are contact bridges mounted in parallel.

The invention is of course not limited to the devices described above by way of example and instead has a scope defined by the following claims.

What is claimed is:

1. Apparatus comprising two fixed electric windings, a moving connection between said two fixed electric windings, and each such winding comprising a base wire in the form of successive spaced turns, said connection including at least two mutually electrically insulated brush means provided for each winding and adapted selectively to contact the said winding or to be registrable in the space between successive turns of the winding without touching said winding, the brush means of each winding being mechanically integral one with another, said connection further including an electrically connective bridge means between corresponding brush means of the respective windings.

2. Apparatus as claimed in claim 1 wherein the brush means for each winding are coplanar.

3. Apparatus as claimed in claim 2 wherein each winding defines an axis and the planes of the brush means related to each winding are perpendicular to the corresponding axis.

4. Apparatus as claimed in claim 3 wherein the windings are coaxial.

5. Apparatus as claimed in claim 3 wherein the windings have spaced and parallel axes.

6. Apparatus as claimed in claim 3 wherein circumferentially adjacent brush means on one winding delimit an arc of a turn in said one winding and the corresponding brush means on the other winding delimit a corresponding arc.

7. Apparatus as claimed in claim 6 wherein each said brush means is of such dimension as to be able to make contact with only one turn at a time and to be able to fit in the interval between turns without contacting such turns.

8. Apparatus as claimed in claim 7 wherein said brush means each comprise a brush and a spring urging the brush against the windings.

9. Apparatus as claimed in claim 8 wherein said bridge means are conductive strips.

10. Apparatus as claimed in claim 8 wherein said windings are connected as autotransformers.

11. Apparatus as claimed in claim 8 wherein said windings are connected as transformers.

References Cited

UNITED STATES PATENTS

| | | | |
|---|---|---|---|
| 1,635,060 | 7/1927 | Thompson | 336—146 X |
| 3,025,452 | 3/1962 | Ross | 336—229 X |

FOREIGN PATENTS

| | | |
|---|---|---|
| 1,002,349 | 10/1951 | France. |
| 1,349,306 | 12/1963 | France. |

DARRELL L. CLAY, *Primary Examiner.*

LEWIS H. MYERS, LARAMIE E. ASKIN, *Examiners.*

D. A. TONE, H. W. COLLINS, *Assistant Examiners.*